United States Patent
Widjeskog et al.

(10) Patent No.: US 10,287,996 B2
(45) Date of Patent: May 14, 2019

(54) GAS VALVE UNIT AND A METHOD OF PERFORMING A PRESSURE TEST TO A GAS VALVE UNIT

(71) Applicant: WÄRTSILÄ FINLAND OY, Vaasa (FI)

(72) Inventors: Klaus Widjeskog, Vaasa (FI); Marko Kuusisaari, Vaasa (FI); Tomas Högnabba, Vaasa (FI)

(73) Assignee: WÄRTSILÄ FINLAND OY, Vaasa (FI)

(*) Notice: Subject to any disclaimer, the term of this patent is extended or adjusted under 35 U.S.C. 154(b) by 0 days.

(21) Appl. No.: 15/749,946

(22) PCT Filed: Jun. 20, 2016

(86) PCT No.: PCT/EP2016/064136
§ 371 (c)(1),
(2) Date: Feb. 2, 2018

(87) PCT Pub. No.: WO2017/220106
PCT Pub. Date: Dec. 28, 2017

(65) Prior Publication Data
US 2019/0101069 A1 Apr. 4, 2019

(51) Int. Cl.
*F02D 19/02* (2006.01)
*F02M 21/02* (2006.01)
*G01M 3/28* (2006.01)

(52) U.S. Cl.
CPC ......... *F02D 19/025* (2013.01); *F02M 21/023* (2013.01); *F02M 21/0293* (2013.01); *G01M 3/283* (2013.01); *G01M 3/2876* (2013.01)

(58) Field of Classification Search
CPC .. G01M 15/08; G01M 15/102; G01M 15/042; G01M 15/044; G01M 15/06;
(Continued)

(56) References Cited

U.S. PATENT DOCUMENTS

| 5,341,883 A * | 8/1994 | Ringgenberg ........ E21B 34/103 166/324 |
| 6,209,562 B1 * | 4/2001 | Shaw .................... F17C 13/025 137/15.18 |
| 2006/0032240 A1 * | 2/2006 | Ehrne .................... F04B 37/08 62/55.5 |

FOREIGN PATENT DOCUMENTS

| DE | 10 22 860 A1 | 8/2001 |
| DE | 10 2013 006301 A1 | 10/2014 |
| DE | 10 2013 007324 A1 | 10/2014 |

OTHER PUBLICATIONS

International Search Report (PCT/ISA/210) dated Mar. 17, 2017, by the Japanese Patent Office as the International Searching Authority for International Application No. PCT/EP2016/064136.
(Continued)

*Primary Examiner* — Andre J Allen
(74) *Attorney, Agent, or Firm* — Buchanan Ingersoll & Rooney PC (57) ABSTRACT

The disclosure relates to a gas valve unit having an enclosure provided with an inlet and an outlet, with an inner pipe arranged to extend from the inlet to the outlet via the enclosure forming a gas tight piping inside the enclosure, and an outer pipe arranged to open into the enclosure via an at least one opening. Walls of the inner pipe and the outer pipe form a space there between as a first volume, and the enclosure forms a space inside as a second volume, the first and second volumes being arrangeable in flow communication with each other via an opening in connection with the outer pipe. At least one blocking unit selectively blocks the at least one opening in connection with the outer pipe and the flow communication between the first volume and the second volume.

10 Claims, 6 Drawing Sheets

(58) Field of Classification Search
CPC .... G01M 15/104; G01M 15/11; G01M 15/02; G01M 15/046; G01M 15/12; G01M 13/00; G01M 13/04; G01M 15/05; G01M 15/09; G01M 15/10; G01M 15/106; G01M 17/00; G01M 1/14; G01M 3/00; G01M 3/025; G01M 3/3236; F02D 41/1454; F02D 41/221; F02D 41/1441; F02D 41/22; F02D 2041/224; F02D 2200/0602; F02D 2200/101; F02D 35/023; F02D 41/009; F02D 2041/2058; F02D 2041/228; F02D 2200/0625; F02D 41/0097; F02D 41/123; F02D 41/1459; F02D 41/1495; F02D 41/2467; F02D 41/3809; F02D 2041/2055; F02D 2041/286; F02D 2200/0414; F02D 2200/0418; F02D 2200/0612; F02D 2200/0618; F02D 2200/1015; F02D 2250/14; F02D 29/06; F02D 33/003; F02D 41/0027; F02D 41/0085; F02D 41/0087; F02D 41/0235; F02D 41/025; F02D 41/0295; F02D 41/1446; F02D 41/1494; F02D 41/1497; F02D 41/1498; F02D 41/20; F02D 41/222; F02D 41/2474; F02D 41/26; F02D 11/106; F02D 19/025; F02D 19/027; F02D 19/0634; F02D 2009/0225; F02D 2041/0067; F02D 2041/1432; F02D 2041/2013; F02D 2041/2027; F02D 2041/227; F02D 2041/281; F02D 2041/283; F02D 2041/285; F02D 2041/389; F02D 2200/021; F02D 2200/025; F02D 2200/0404; F02D 2200/0416; F02D 2200/0604; F02D 2200/0611; F02D 2200/0616; F02D 2200/063; F02D 2200/1002; F02D 2200/1012; F02D 2250/04; F02D 2250/06; F02D 2250/32; F02D 2400/08; F02D 35/024; F02D 35/025; F02D 35/027; F02D 35/028; F02D 41/0002; F02D 41/0025; F02D 41/0052; F02D 41/0077; F02D 41/0205; F02D 41/029; F02D 41/042; F02D 41/12; F02D 41/1401; F02D 41/1439; F02D 41/1452; F02D 41/1456; F02D 41/18; F02D 41/187; F02D 41/2429; F02D 41/2432; F02D 41/247; F02D 41/263; F02D 41/28; F02D 41/3005; F02D 41/3845; F02D 41/40; F02D 41/401; F02D 41/405

USPC .......................................... 73/114.01–114.81

See application file for complete search history.

(56) References Cited

OTHER PUBLICATIONS

Written Opinion (PCT/ISA/237) dated Mar. 17, 2017, by the Japanese Patent Office as the International Searching Authority for International Application No. PCT/EP2016/064136.

* cited by examiner

GAS VALVE UNIT AND A METHOD OF PERFORMING A PRESSURE TEST TO A GAS VALVE UNIT

TECHNICAL FIELD

The present invention relates to a gas valve unit according to the preamble of claim 1 and a method of performing a pressure test to a gas valve unit.

Invention relates also to a method of performing a pressure test to a gas valve unit and method of assembling and pressure testing a gas valve unit for a gas consumer in a marine vessel.

BACKGROUND ART

A gas as a fuel for internal combustion engines in marine vessels has become more common because of the environmental reasons. At the same time the equipment for handling and regulating gas fuel is subjected to stringent safety regulations. A gas valve unit is commonly referred to a module located between a gas storage system and an engine, for instance a so called dual-fuel engine in a marine vessels. One gas valve unit is required for each engine, or generally for each gas consumer. It is used mainly to regulate the gas pressure and ensure a safe disconnection of the gas system, if so desired. The gas valve unit comprise an enclosure, gas piping and several additional components, for example filters and valves, inside the enclosure for measuring and regulating gas.

Before using the enclosed gas valve unit, the enclosure, as well as the gas supply piping, has to be pressure tested. The gas valve unit with enclosed design is usually pressure tested at the factory with presence of class surveyor.

The gas valve unit with enclosed design is pressure tested at the factory with presence of a class surveyor.

Contrary to enclosure, an inlet and an outlet gas pipe connected to a gas valve unit has to be tested on the installation place, in a marine vessel. For instance, at the vessel new welding seams are made on the gas lines when adjusting and attaching the gas valve unit's gas inlet and outlet pipe to the gas piping of the vessel. Lifting the gas valve unit to its exact position and connecting it to gas supply piping requires flexibility, for example necessary tolerances has to be taken into account. Final welds are made when unit is at the final installation position.

Due to safety reasons, water is usually used for pressure tests. However, water entering into the enclosure of the gas valve unit will cause problems for measuring components and other possible instruments that are sensitive to water.

An object of the invention is to provide a gas valve unit with a solution for pressure test arrangement of the annular space of the double wall pipes upstream and downstream of the gas valve unit in which the test setup is considerably improved compared to the prior art solutions.

DISCLOSURE OF THE INVENTION

The objects of the invention can be met substantially as is disclosed in the independent claims and in the other claims describing more details of different embodiments of the invention.

According to the invention a gas valve unit and a method of pressurizing the gas valve unit for use in a gas consumer in the vessel, such as gas fuelled internal combustion piston engine, is presented.

A gas valve unit for a gas consumer in a marine vessel comprises an enclosure provided with an inlet and an outlet, which inlet and outlet comprises an inner pipe and an outer pipe, wherein the inner pipe is arranged to extend from the inlet to the outlet via the enclosure forming a gas tight internal piping inside the enclosure, and the outer pipe is arranged to open into the enclosure via an at least one opening, and further the walls of the inner pipe and the outer pipe forming a space there between, which space is a first volume, and the enclosure forming a space inside, which space is a second volume, and the first volume and the second volume are arrangeable in flow communication with each other via an opening in connection with the outer pipe. The gas valve unit comprises an at least one blocking unit selectively blocking and unblocking the at least one opening in connection with the outer pipe and the flow communication between the first volume and the second volume.

This arrangement makes the installation of the gas valve unit and particularly performing pressure test in more efficient manner and the test setup is considerably improved.

Thus, the internals of the gas valve unit can be easily isolated from the connected external piping of the installation site while performing necessary pressure test or tests for the first volume of the double wall piping. This makes it possible to perform the pressure test of the site piping without removing components inside the gas valve unit that would suffer from pressure testing with water.

According to an embodiment of the invention the blocking unit is provided with triggering system operable outside the enclosure.

According to an embodiment of the invention the blocking unit is provided with triggering system which provides stored potential energy when the blocking unit is set to position in which the flow communication between the first volume and the second volume is closed, for use in the blocking unit to allow the locking unit to unblock the flow communication between the first volume and the second volume.

According to an embodiment of the invention the triggering system is provided with a spring which provides stored potential energy when the blocking unit is set to position in which the flow communication between the first volume and the second volume is closed, and which spring is releasable for use in the blocking unit to allow the locking unit to un-block the flow communication between the first volume and the second volume, and which spring is releasable from outside the enclosure.

According to an embodiment of the invention the outer pipe is arranged to extend into the enclosure around the inner pipe over a specific length, and that the outer pipe has an at least one opening into enclosure arranged to the wall of the outer pipe and that the end of the outer pipe is sealed to the inner pipe in a tight manner, and that the blocking unit comprises a sleeve element arranged to block the at least one opening in the wall of the outer pipe in a tight manner.

According to an embodiment of the invention the sleeve element is arranged slidably over the outer pipe to selectively blocking and unblocking the at least one opening in connection with the outer pipe.

According to an embodiment of the invention the sleeve element is provided with triggering system which triggering system is provided with a spring which provides stored potential energy when the sleeve element is set to position in which the flow communication between the first volume and the second volume is closed, and which spring is releasable for allowing the sleeve element to slide so as to unblock the flow communication between the first volume and the second volume.

According to an embodiment of the invention the outer pipe has an at least one opening into the enclosure arranged to the end of the outer pipe, and that the blocking unit comprises a sleeve element slideably arranged around the inner pipe to block the at least one opening at the end of the outer pipe in a tight manner.

A method of performing a pressure test to a gas valve unit comprising an enclosure provided with an inlet and an outlet pipes, which the inlet and the outlet pipes comprises an inner pipe and an outer pipe, wherein the inner pipe is arranged to extend from the inlet to the outlet via the enclosure forming a continuous gas tight internal piping inside the enclosure, and the outer pipe is arranged to open into the enclosure via at least one opening, and further the walls of the inner pipe and the outer pipe forming a space there between, which space is a first volume and further the enclosure forming a space inside, which space is a second volume, and the first volume and the second volume are arrangeable in flow communication with each other via an opening in connection with the outer pipe and further at least one blocking unit selectively blocking and unblocking the at least one opening in connection with the outer pipe, and the method comprising step wherein:

the gas valve unit is coupled with a piping of its installation site, and the flow communication between the first volume and the second volume is blocked with the at least one blocking unit;

the first volume is pressurized, and the pressure is maintained in the first volume over a predetermined period of time while the second volume is at the initial pressure and separated from the first volume;

after successful pressure test the pressure from the first volume is released, and the flow communication between the first volume and the second volume inside the enclosure is unblocked.

This procedure makes the installation of the gas valve unit and particularly performing pressure test of the external piping connected to the gas valve unit more efficient.

A procedure for assembling and pressure testing the gas valve unit for a gas consumer in a marine vessel according to an embodiment of the invention comprises providing a gas tight enclosure forming a space inside thereof and arranging in inlet and an outlet to the enclosure, wherein the inlet and outlet comprise a pipe, into which pipe at least one opening is arranged to open into the enclosure, pressure testing the space inside the enclosure and the inlet and the outlet using liquid, providing an internal piping for extending between the inlet and an outlet in the enclosure, pressure testing the internal piping using liquid, assembling a valve member and desired instruments to the internal piping, assembling the internal piping into the enclosure such that the piping extends inside the enclosure from the inlet to the outlet, and the internal piping is led through the inlet and the outlet such a pipe of the internal piping forms an inner pipe and the pipe forms an outer pipe of the inlet and the outlet, pressure testing a first volume inside the enclosure and a second volume between the inner pipe and the outer pipe in the inlet and the outlet using gas, coupling the gas valve unit with a piping of its installation site such that inner piper and the outer pipe are both coupled to the piping, blocking the flow communication between the first volume and the second volume with at least one blocking unit, arranged for selectively blocking and unblocking the at least one opening in connection with the outer pipe, pressure testing the first volume while the second volume is at the initial pressure and separated from the first volume, after successful pressure test releasing the pressure from the first volume and unblocking the flow communication between the first volume and the second volume inside the enclosure with the at least one blocking unit.

The liquid used for pressure test is advantageously water and the gas used for pressure test is advantageously air.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
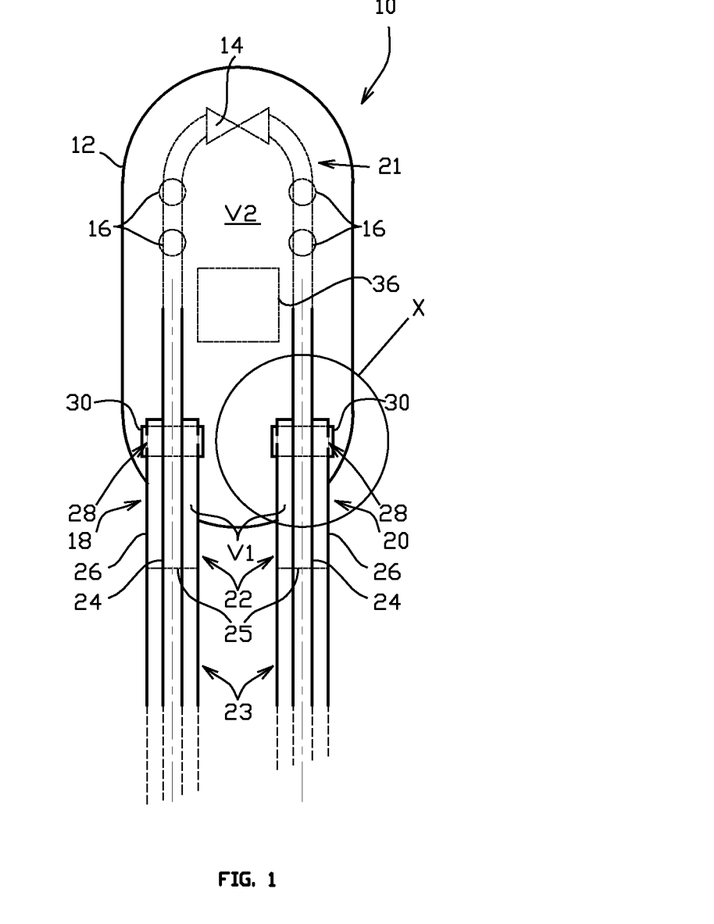
FIG. 1 illustrates a gas valve unit according to an embodiment of the invention.

FIG. 1 depicts a gas valve unit 10 according to an embodiment of the invention. A gas valve unit comprise an enclosure 12 which is arranged to be pressure proof i.e. it has been constructed as a so called pressure vessel. The gas valve unit 10 and particularly the enclosure 12 can be of various forms and it can be mounted in different positions depending e.g. on its form or floor space available. The enclosure 12 encloses a valve member and a number of desired optional instruments 16 therein. The instruments may comprise necessary equipment for measuring, analysing, filtering or otherwise handling the gas. A gas valve unit 10 further comprises an inlet 18 and an outlet 20 by means of which external piping 22 for the gas delivery system of a gas consumer (not shown) communicates with the enclosure 12 and the valve member 14 and the instruments 16 therein.

The gas supplied to the gas consumer may be for example natural gas, petroleum gas, synthetic gas, hydrogen or a mixture thereof.

Via the inlet 18 and the outlet 20 the gas may flow through the gas valve unit along the pipe 24, when the valve member 14 is open, to the gas consumer.

The external piping 22 as well as the inlet 18 and the outlet 20 comprise an inner pipe 24 and an outer pipe 26 which are advantageously arranged coaxially in respect to each other. The inner pipe 24 is the pipe where the valve member 14 and a number of desired optional instruments 16 are arranged forming the internal piping 21. The external piping may therefore be called as a double wall piping also. The inner pipe 24 enters into the enclosure 12 via the inlet 18 and forms a continuous gas tight internal piping 21 inside the enclosure before exit the enclosure via the outlet 20. The outer pipe 26 at the inlet and the outlet is arranged to open into the space of the enclosure 12 via at least one opening 28 in connection with the outer pipe 26. The walls of the inner pipe 24 and the outer pipe 26 form a space in between, which space is a first volume V1, and the enclosure 12 forms a space inside thereof, which space is a second volume V2, and the first volume and the second volume are arrangeable in flow communication with each other via the opening in connection with the outer pipe 26. There is at least one blocking unit 30 arranged in connection with the outer pipe 26 for selectively blocking and unblocking the at least one opening 28. The blocking unit 30 therefore blocks or unblocks the flow communication between the first volume V1 and the second volume V2. Normally the connection between the volumes V1 and V2 needs to be open such that the possible leakage gas may be securely handled. More precisely the blocking unit is advantageously such that once the communication is opened special actions are needed to close the communication again.

In the embodiment of FIG. 1 the outer pipe 26 extends into enclosure 12 a specific length before ending. The outer pipe has at least one opening 28 into enclosure in its wall. The first volume V1 between the wall of the inner pipe 24 and the outer pipe 26 is preferably annular. The first and second volumes V1, V2 are necessary for safety reasons using gas as a fuel in the gas consumer, so these are also called safety barriers. The first and second volumes are in flow connection via the openings 28 in the outer pipe 26 and these are continuously ventilated when operating the engines with gas. A detail X in the FIG. 1 is explained more detailed below referring to FIG. 2.

Figure 2:
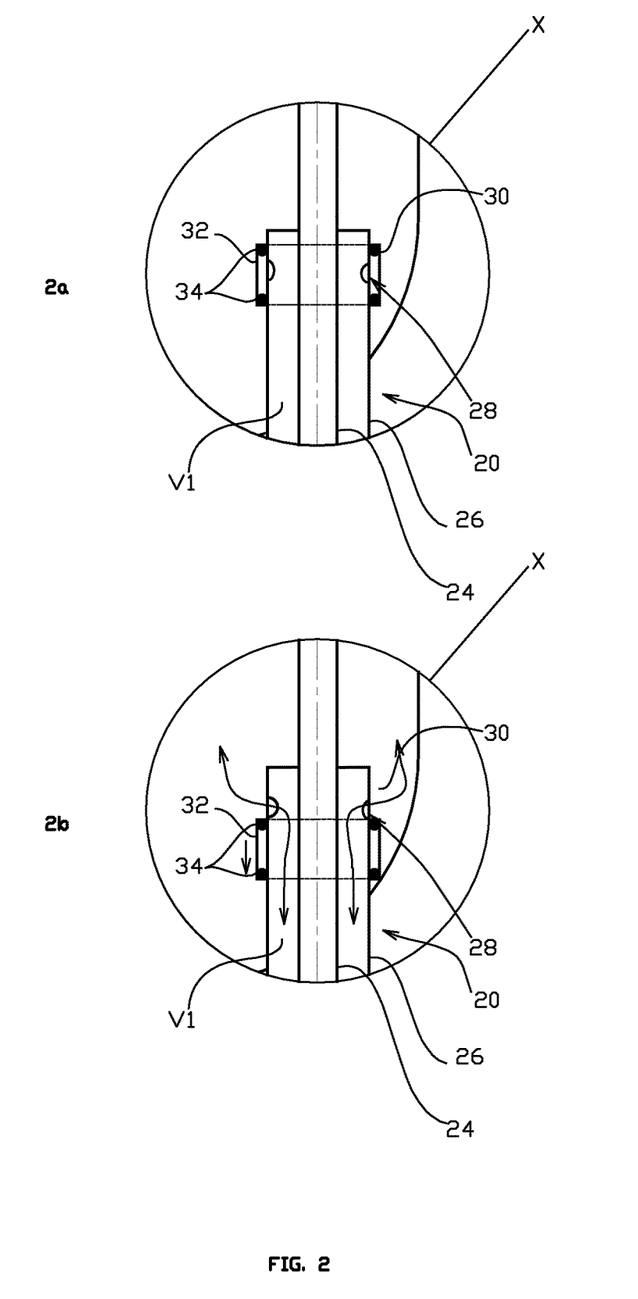
FIG. 2 illustrates a detail of FIG. 1 in two operational stages.

FIGS. 2a and 2b depict the embodiment of FIG. 2 in more detailed manner. As is depicted in FIG. 2 the outer pipe 26 is arranged to extend into the enclosure 12 around and coaxially to the inner pipe 24 over a specific length. The outer pipe 26 of the double wall piping ends after a specific length inside the enclosure. An end of the outer pipe i.e. the annular gap formed between the inner pipe and the outer pipe is closed with a suitable cover part, such as a flange and/or welding. The part of the outer pipe 26 inside the enclosure is provided with at least one opening, which opens into second volume V2 in the enclosure 12. Preferably, there are several openings 28 provided to the wall of the outer pipe 26. Thus, there is a flow route provided between the first volume V1, via the openings 28, and the second volume V2. The blocking unit comprises in this embodiment a sleeve element 32 and sealing rings 34 between the sleeve element 32 and the outer pipe 26. The sleeve element is here arranged slideable along the outer pipe 26 in axial direction thereof. The position of the sleeve element in respect to the opening 28 rules the status of the flow communication, i.e. whether it is blocked or unblocked.

Now referring back to FIG. 1 the enclosure 12 is provided with an access door which is openable but still pressure proof and a gas tight construction. The practical solution of the access door may vary and it may be realized e.g. so the enclosure 12 is formed of two similar halves the one of which serves as a body of the enclosure and the other one as the access door. The halves may be provided with flanges at their rims by means of which the halves may be joined i.e. the access door closed. The access door may be used for service of the valve member 14 and the instruments 16 in the enclosure 12.

Preferably, the outer pipe wall is gas tightly attached to the wall of the enclosure 12 by welding. FIG. 2a depicts a closed position, i.e. when the connection between the first volume V1 and the second volume V2 is blocked. The FIG. 2b depicts an open position allowing the flow between the first volume V1 and the second volume V2.

The blocking unit 30 may be realized in various ways. The blocking unit may, for example, be a clamp-like unit.

Now, a pressure test of the gas valve unit 10 in the embodiment of FIGS. 1 and 2 where the valve member 14 and the instruments 16 have already been installed, is performed such that prior to the test, the flow communication between the first volume V1 and the second volume V2 is blocked by positioning the blocking unit 30 to both the inlet 18 side and the outlet side 20 extension of the outer pipe 26 in the enclosure 12 such that the opening 28 or openings, if more than one openings provided, are covered. Thus, the first volume V1 is separated from the second volume V2 and the test liquid, such as water, may not enter the second volume V2 during the pressure test.

For better understanding the gist of invention, the assembling and pressure testing a gas valve unit 10 for a gas consumer in a marine vessel is explained. The procedure comprising providing a gas tight enclosure 12 forming a space V2 inside thereof and arranging in inlet 18 and an outlet 20 to the enclosure 12, wherein the inlet 18 and outlet 20 comprises a pipe 26, into which pipe 26 at least one opening 28 is arranged to open into the enclosure 12. At this stage the space V2 inside the enclosure 12 and the inlet 18 and the outlet 20 are pressure tested using liquid. There are no liquid or pressure sensitive instruments inside the enclosure.

Next providing an internal piping 21 arranged for extending between the inlet 18 and an outlet 20 in the enclosure 12 and pressure testing the internal piping 21 using liquid. After the pressure testing assembling a valve member 14 and instruments 16 to the internal piping 21. Next assembling the internal piping 21 into the enclosure 12 such that the piping 21 extends inside the enclosure 12 from the inlet 18 to the outlet 20, and the internal piping 21 is led through the inlet 18 and the outlet 20 such a pipe 24 of the internal piping 21 forms an inner pipe 24 and the pipe 26 forms an outer pipe 26 of the inlet 18 and the outlet 20.

After that is performed pressure testing to the first volume V2 inside the enclosure 12 and the second volume V1 between the inner pipe 24 and the outer pipe 26 in the inlet and the outlet, using gas.

If not earlier, at latest now the gas valve unit is at the installation site and the assembly of the gas valve unit 10 continues such that it is coupled with a piping 23 of its installation site such that inner piper 24 and the outer pipe 26 are both coupled to the piping 23. The coupling of the gas valve unit 10 with the piping 23 of the site at the installation site is schematically depicted by a dashed line 25. By means of the coupling 25 the inner pipe 24 and the outer pipe 26 and the respective piping 23 of the site are joined by suitable means known as such. Due to the freshly made coupling the external piping 22, 23 outside the enclosure 12 is pressure tested again.

This is performed such that flow communication between the first volume V1 and the second volume V2 is blocked by the blocking unit 30. In the case of FIG. 1 it is ensured that the sleeve operating as the blocking unit is slid to correct axial position over the outer pipe 26 covering the openings 28. Next, the first volume V1, which is now connected to the respective part i.e. the outer space of the double piping, of the site piping 23 is filled and pressurized with water and the pressure test is performed to the first volume V1. The pressure is maintained over a predetermined period of time while maintain the second volume V2 unpressurized at the initial pressure and separated from the first volume V1. After successful test the pressure is released from the first volume V1 and water is removed. Next the flow communication between the first volume V1 and the second volume V2 is unblocked.

In the pressure test the pressure is raised to a predetermined level and the pressure is observed over a predetermined period of time for detecting leakage. The test is successful if the pressure remains at desired level during the predetermine period of time.

Figure 3:
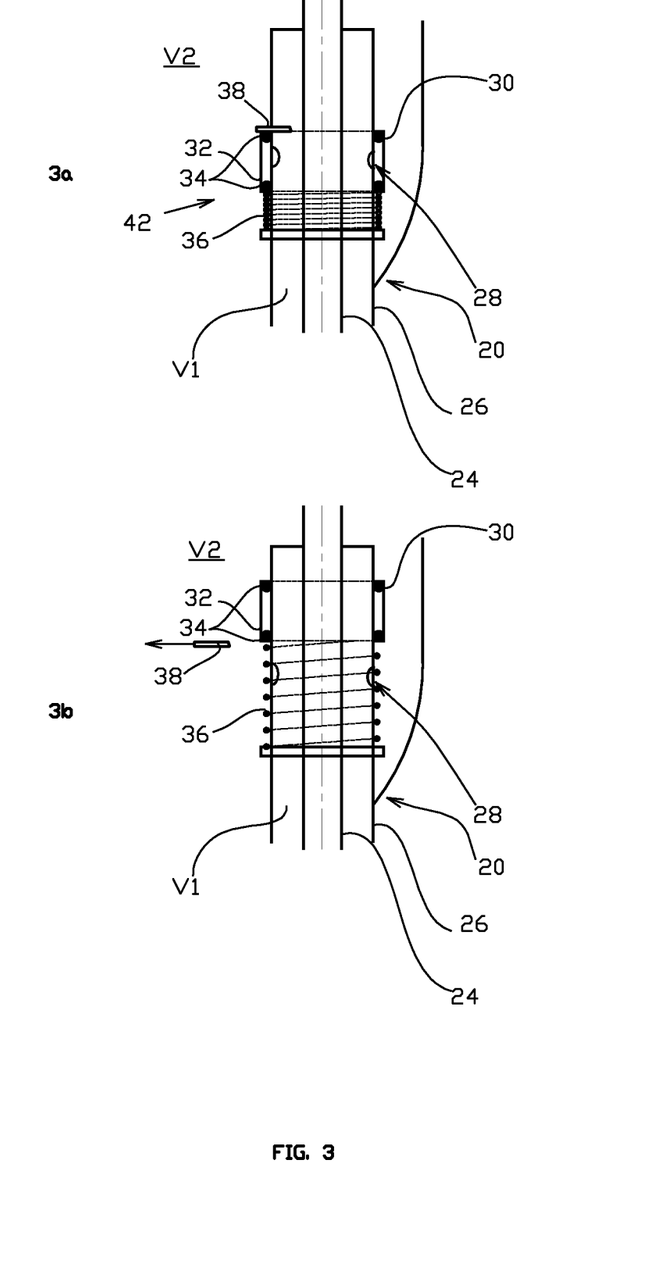
FIG. 3 illustrates a detail of a gas valve unit according to an embodiment of the invention.

Another embodiment of the blocking unit 30 is depicted in the FIG. 3. The blocking unit is provided with triggering system 42 which provides stored potential energy when the blocking unit 30 is set to position in which the flow communication between the first volume V1 and the second volume V2 is closed. The triggering system is for use to allow the locking unit to unblock the flow communication between the first volume and the second volume. Here the blocking unit is a mechanical slide sleeve, which is in the FIG. 3a at a position blocking the flow through the openings 28. There is a spring provided to apply a force to the sleeve and provide stored potential energy to move the sleeve. The spring is here tensioned and the sleeve is locked immobile with a locking member 38. When the pressure test is completed, the locking is opened by removing the locking member 38 and the sleeve moves to position opening the flow connection between the first volume V1 and the second volume V2. The blocking unit 30 is provided with triggering system operable outside of the enclosure 12. Locking member may be actuated manually by pulling a wire or alike which wire extends to outside the enclosure through a small closable hole. When pulling the wire, the locking member is removed and the blocking unit slides to position shown in FIG. 3b. The locking member 38 can be pulled out of the enclosure and the small hole is closed pressure tightly.

The moving force applied to the sleeve in addition to or alternatively to the spring force 36 can be gravity, hydraulic force or pneumatic force. The spring and the sleeve is set to position 3a advantageously at the assembly site. The enclosure is then closed. At the installation site the gas valve unit is lifted to its position and adjusted. In accordance with the regulations the pressure test is performed to the gas piping, and it is possible to do without opening the enclosure and removing the unit. When the pressure test is completed, the locking is opened by removing the locking member 38 and the sleeve moves to position opening the flow connection between the first volume V1 and the second volume V2. This is done at the installation site.

Figure 4:
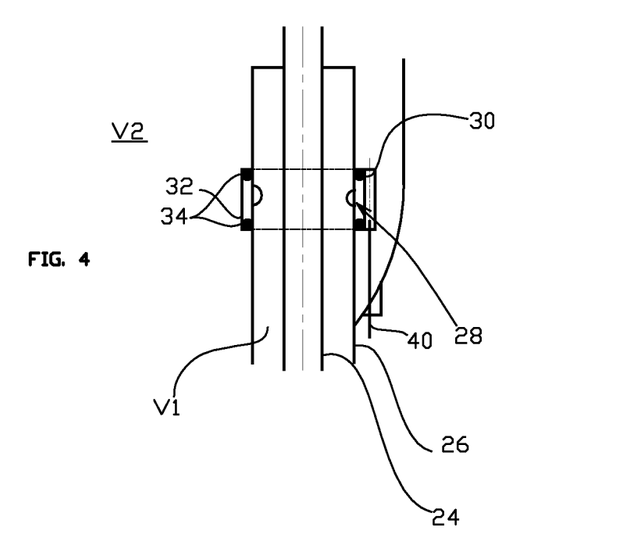
FIG. 4 illustrates a detail of a gas valve unit according to another embodiment of the invention.

According to another embodiment of the invention shown in FIG. 4 the blocking unit 30 is provided with triggering system operable outside the enclosure 12. In this embodiment the blocking unit can be moved by a worm screw drive or a like extending through the enclosure in sealed manner.

Figure 5:
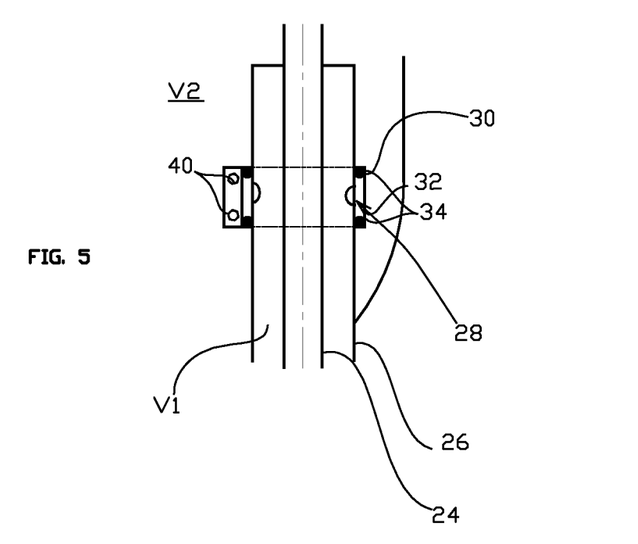
FIG. 5 illustrates a detail of a gas valve unit according to another embodiment of the invention.

According to another embodiment of the invention shown in FIG. 5 the blocking unit can be a clamp sleeve tightened by screws or bolts around the outer pipe to block the openings. The clamp sleeve is removed for opening the flow connection through the openings 28.

The pressure testing of the enclosure volume i.e. the second volume V2 is performed with water and the enclosure is tested without the instruments inside. After water pressure testing, necessary components and the instruments are installed into the enclosure 12. The tightness of the unit is then tested with air.

Figure 6:
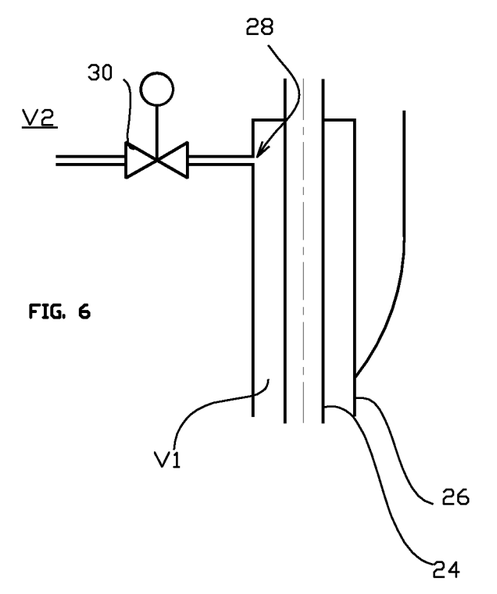
FIG. 6 illustrates a detail of a gas valve unit according to another embodiment of the invention and FIG. 7 illustrates a gas valve unit according to another embodiment of the invention.

In FIG. 6 there is depicted a symbolic illustration the blocking unit 30 generally as a valve. It is apparent to a skilled person in the art the various modification of such valve, and generally of the blocking unit, may be applied depending on the case. The valve is closed or opened for selectively blocking and unblocking the at least one opening 28 in connection with the outer pipe 26 and the flow communication between the first volume V1 and the second volume V2. The valve 30 may be manually operated. Alternatively the valve may be operated with an actuator under control of programmable control unit. The programmable control unit may be provided with executable instructions to irreversibly opening the valve after the pressure test.

Figure 7:
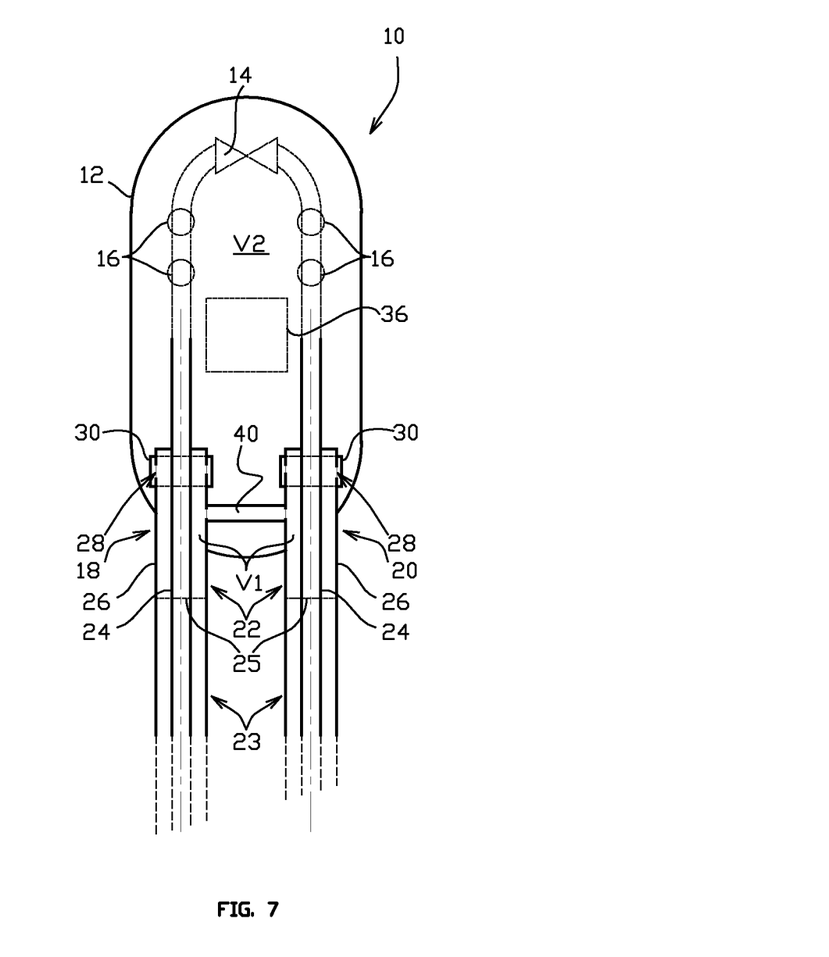

In the FIG. 7 there is shown a further development of the embodiment of FIG. 1. The gas valve unit 10 is otherwise similar and may be pressure tested similarly to that shown in the FIG. 1 but here the first volume V1 on the inlet 18 side is continuously connected to first volume V1 of outlet side 20. This may be realized for example by a pipe 40 inside or outside (not shown) of the enclosure connecting the outer pipes 26 with each other. When performing pressure testing of the first volume V1 according to the invention it is possible to test both inlet and outlet sides at same time with one test.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A gas valve unit, comprising:
   an enclosure provided with an inlet and an outlet, which inlet and outlet includes an inner pipe and an outer pipe, wherein the inner pipe is arranged to extend from the inlet to the outlet via the enclosure forming a gas tight internal piping inside the enclosure, and the outer pipe is arranged to open into the enclosure via at least one opening, wherein walls of the inner pipe and the outer pipe form a space there between, which space is a first volume, and the enclosure forms a space inside, which space is a second volume, and the first volume and the second volume are arrangeable in flow communication with each other via the at least one opening in connection with the outer pipe;
   at least one blocking unit configured for selectively blocking and unblocking the at least one opening in connection with the outer pipe and the flow communication between the first volume and the second volume.

2. A gas valve unit according to claim 1, wherein the blocking unit comprises:
a triggering system operable outside the enclosure.

3. A gas valve unit according to claim 1, wherein the blocking unit comprises:
a triggering system configured to provide stored potential energy when the blocking unit is set to position in which flow communication between the first volume and the second volume is closed, for use in the blocking unit to allow the blocking unit to unblock the flow communication between the first volume and the second volume.

4. A gas valve unit according to claim 3, wherein the triggering system comprises:
a spring configured to provide stored potential energy when the blocking unit is set to position in which flow communication between the first volume and the second volume is closed, which spring is releasable for use in the blocking unit to allow the blocking unit to unblock the flow communication between the first volume and the second volume, and which spring is releasable from outside the enclosure.

5. A gas valve unit according to claim 1, wherein the outer pipe is arranged to extend into the enclosure around the inner pipe over a specific length, and the outer pipe has an at least one opening into the enclosure arranged to the wall of the outer pipe, and wherein an end of the outer pipe is sealed to the inner pipe in a tight manner, and wherein the blocking unit comprises:
a sleeve element arranged to block the at least one opening in the wall of the outer pipe in a tight manner.

6. A gas valve unit according to claim 5, wherein the sleeve element is arranged slidably over the outer pipe and is configured for selectively blocking and unblocking the at least one opening in connection with the outer pipe.

7. A gas valve unit according to claim 6, wherein the sleeve element comprises:
a triggering system with a spring configured to provide stored potential energy when the sleeve element is set to position in which flow communication between the first volume and the second volume is closed, and which spring is releasable allowing the sleeve element to slide so as to unblock the flow communication between the first volume and the second volume.

8. A gas valve unit according to claim 1, wherein the outer pipe has at least one opening into the enclosure arranged to the end of the outer pipe, and the blocking unit comprises:
a sleeve element slidably arranged around the inner pipe to block the at least one opening at the end of the outer pipe in a tight manner.

9. A method of performing a pressure test to a gas valve unit having an enclosure provided with an inlet and an outlet, wherein the inlet and the outlet have an inner pipe and an outer pipe, wherein the inner pipe is arranged to extend from the inlet to the outlet via the enclosure forming a continuous gas tight internal piping inside the enclosure, and the outer pipe is arranged to open into the enclosure via at least one opening, and wherein walls of the inner pipe and the outer pipe form a space there between, which space is a first volume, and the enclosure forms a space inside as a second volume, and wherein the first volume and the second volume are arrangeable in flow communication with each other via the at least one opening in connection with the outer pipe, and wherein at least one blocking unit is configured for selectively blocking and unblocking the at least one opening in connection with the outer pipe, the method comprising:
coupling the gas valve unit with a piping of its installation site, and blocking flow communication between the first volume and the second volume with the at least one blocking unit;
pressurizing the first volume, and maintaining pressure in the first volume over a predetermined period of time while the second volume is at an initial pressure and separated from the first volume;
releasing, after a successful pressure test, the pressure from the first volume; and
unblocking the flow communication between the first volume and the second volume inside the enclosure.

10. A method of assembling and pressure testing a gas valve unit for a gas consumer in a marine vessel, the method comprising:
providing a gas tight enclosure forming a space inside thereof and arranging an inlet and an outlet to the enclosure, wherein the inlet and outlet have a pipe, into which pipe at least one opening is arranged to open into the enclosure;
pressure testing the space inside the enclosure and the inlet and the outlet, using liquid;
providing an internal piping for extending between the inlet and an outlet in the enclosure;
pressure testing the internal piping using liquid;
assembling a valve member and instruments to the internal piping;
assembling the internal piping into the enclosure such that the piping extends inside the enclosure from the inlet to the outlet, and the internal piping is led through the inlet and the outlet, wherein a pipe of the internal piping forms an inner pipe and the pipe forms an outer pipe of the inlet and the outlet;
pressure testing a first volume inside the enclosure and a second volume between the inner pipe and the outer pipe in the inlet and the outlet, using gas;
coupling the gas valve unit with a piping of its installation site such that the inner piper and the outer pipe are both coupled to the piping;
blocking flow communication between the first volume and the second volume with at least one blocking unit configured and arranged for selectively blocking and unblocking the at least one opening in connection with the outer pipe;
pressure testing the first volume while the second volume is at an initial pressure and separated from the first volume;
after a successful pressure test, releasing pressure from the first volume; and
unblocking the flow communication between the first volume and the second volume inside the enclosure with the at least one blocking unit.

* * * * *